United States Patent [19]
Eberle et al.

[11] Patent Number: 4,783,990
[45] Date of Patent: Nov. 15, 1988

[54] APPARATUS FOR MEASURING THE QUANTITY OF GAS PUMPED BY A COMPRESSOR

[75] Inventors: Arthur C. Eberle, Upper Arlington; David M. Thomson, Columbus, both of Ohio

[73] Assignee: Columbia Gas System Service Corporation, Columbus, Ohio

[21] Appl. No.: 68,027

[22] Filed: Jun. 29, 1987

Related U.S. Application Data

[63] Continuation-in-part of Ser. No. 800,784, Nov. 22, 1985, Pat. No. 4,676,095.

[51] Int. Cl.⁴ .......................................... G01M 15/00
[52] U.S. Cl. ......................................... 73/112; 73/239
[58] Field of Search ................... 73/112,115, 168, 249, 73/239, 232, 801; 340/679; 364/400, 496, 505, 506, 551; 417/19, 63, 22

[56] References Cited

U.S. PATENT DOCUMENTS

| | | | |
|---|---|---|---|
| 1,545,752 | 7/1925 | Freeman | 73/112 |
| 1,691,360 | 11/1928 | Reagan | 73/112 |
| 1,956,309 | 4/1934 | Borden . | |
| 2,339,150 | 1/1944 | Codrington . | |
| 2,679,754 | 6/1954 | Flamm | 73/115 |
| 2,826,068 | 3/1958 | Sperry . | |
| 2,937,526 | 5/1960 | Roche . | |
| 2,970,474 | 2/1961 | Kendig | 73/112 |
| 3,572,959 | 3/1971 | Shaughnessy | 417/22 |
| 3,665,399 | 5/1972 | Zehr et al. | 340/679 |
| 3,729,989 | 5/1973 | Little . | |
| 3,747,404 | 7/1973 | Novak | 73/168 |
| 4,051,351 | 9/1977 | Mallick et al. . | |
| 4,496,286 | 6/1985 | Gagnon | 417/22 |
| 4,584,654 | 4/1986 | Crane | 73/112 |
| 4,584,876 | 4/1986 | Aprill, Jr. | 73/168 |
| 4,676,095 | 6/1987 | Eberle et al. | 73/112 |

FOREIGN PATENT DOCUMENTS

| | | | |
|---|---|---|---|
| 48310 | 10/1983 | Japan . | |
| 0629360 | 9/1978 | U.S.S.R. | 73/112 |

OTHER PUBLICATIONS

ASME, Solar Powered Microprocessors: An advance in Measurement Accuracy for Gas Producers, Dec. 10, 1981.
Daniel Industries, Inc., Solar Flow Bulletin No. 2411, Solar Flow Microprocessor—Based Low Power Flow Computer.
Daniel Industries, Inc., Bulletin No. 2412, Solarflow 2 Microprocessor—Based Gas Flow Computer for Turbine etc.

Primary Examiner—Stewart J. Levy
Assistant Examiner—Robert R. Raevis
Attorney, Agent, or Firm—Sidney W. Millard

[57] ABSTRACT

An apparatus for measuring the throughput and average suction and discharge pressures of a compressor comprises pressure sensors for measuring the suction and discharge pressures of the compressor and in one embodiment a device for measuring gas temperature. The apparatus further comprises a data processor for receiving signals representative of the suction and discharge pressures of the compressor and generating a signal representative of the throughput of the compressor during a predetermined time interval.

8 Claims, 3 Drawing Sheets

APPARATUS FOR MEASURING THE QUANTITY OF GAS PUMPED BY A COMPRESSOR

This application is a continuation-in-part of copending application Ser. No. 800,784 filed Nov. 22, 1985 and now U.S. Pat. No. 4,676,095.

BACKGROUND OF THE INVENTION

This invention relates to an apparatus and process for measuring the quantity of gas pumped by a compressor, the time averaged suction and discharge pressure and the accumulated compressor operating time.

Small compressors are widely used in the natural gas industry at production wells and storage facilities. Such compressors are used to increase the relatively low pressure of gas (1) emerging from natural gas wells, (2) leaving gas storage facilities or (3) being injected into storage wells, to the far higher pressures (usually of the order of Megapascals) which must be used in long-distance gas pipelines or for any other reason.

The compressor units used for this purpose conventionally contain a small gas engine, powered by natural gas bled from the supply being compressed, and a reciprocating compressor which performs the actual compression. The compressor units often operate unattended for protracted periods in remote locations and may run continuously or be started by timers, pressure switches or by remote control from a central control room. The gas consumption of the gas engines in such compressor units is substantial and it is desirable to determine periodically the efficiency at which such compressor units are operating in order to ensure that loss in efficiency of the compressor unit does not result in unnecessary consumption of the natural gas used as fuel.

To measure operating efficiency of the compressor unit, it is desirable to determine the fuel consumption, the work performed by the compressor unit, the throughput or the quantity of gas pumped by it and other parameters of its operation. Measurement of fuel consumption can readily be effected by conventional techniques known to those skilled in the art. However, hitherto no apparatus capable of measuring all these parameters and appropriate for long-term unattended use at remote locations, often without commercial power, such as those where many such compressor units are installed, has been available. Consequently, at present such compressor units are provided only with a revolution counter arranged to count the total number of engine revolutions of the compressor unit. Although such an engine revolution counter can in some cases give an indication of reduced efficiency of the compressor unit, in many cases an engine revolution counter may fail to detect loss of efficiency because the work performed by the compressor is not necessarily directly proportional to the engine revolutions. For example, if a compressor has bad valves, it can operate with a very low gas throughput, and reduction in gas throughput is not indicated by an engine revolution counter.

Accordingly, there is a need for an apparatus for measuring the throughput of a compressor, this apparatus being sufficiently small, economical and reliable to be suitable for installation on compressor sets used in natural gas production and storage facilities, and this invention provides such an apparatus.

Other indicators of the effectiveness of the compressor operations which it would be desirable to monitor and display are the throughput, which is the time rate at which the compressor pumps gas, the average over time of both the suction pressure and the discharge pressure and the accumulated total compressor running time.

SUMMARY OF THE INVENTION

This invention provides apparatus for measuring the throughput, that is the quantity per unit of time, of gas pumped through the compressor. For measuring the throughput, the apparatus has a first pressure sensor for measuring the suction pressure of gas entering the compressor and a second pressure sensor for measuring the discharge pressure of the gas leaving the compressor. The apparatus further includes a data storage means which stores previously entered data representing the compressor displacement and the piston clearance. A calculating means is arranged to receive the two signals from the pressure sensors and the stored data and to calculate from them a signal representative of the throughput of the compressor.

A temperature sensor means for detecting the temperature of the gas in the compressor is advantageously also included and the temperature data is used for calculating the throughput more accurately. The apparatus further includes means for calculating the average suction pressure and the averge discharge pressure averaged over time. Further, there is advantageously provided means for detecting and storing the accumulated total compressor operating time. Means is further provided for displaying the calculated quantities.

DETAILED DESCRIPTION OF THE INVENTION

Figure 1:
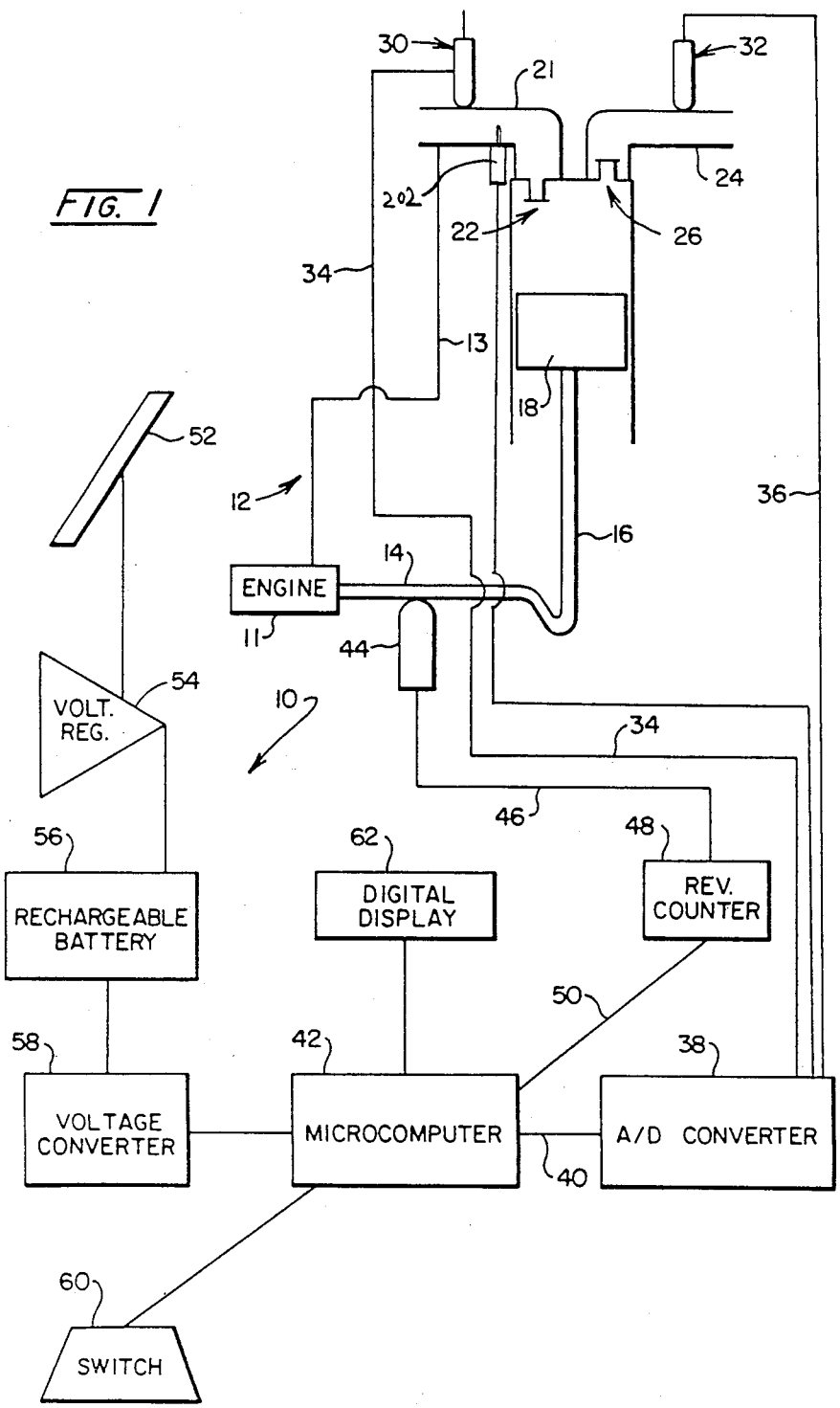
FIG. 1 is a schematic diagram showing an apparatus of the invention in use on a compressor set.

FIG. 1 shows schematically an apparatus of the invention, generally designated 10, being used in conjunction with a reciprocating compressor set, generally designated 12. For ease of illustration, only the compressor part of the compressor set is shown in FIG. 1, the engine 11 part being omitted.

The construction of the compressor set 12 is conventional and will therefore only be described very briefly. The compressor set 12 comprises a crankshaft 14 rotated by the engine part of the compressor set. This crankshaft 14 is connected to a connecting rod 16, which is in turn connected to a piston 18 so that rotation of the crankshaft 14 causes the piston 18 to reciprocate within a cylinder. The cylinder is provided with an inlet line 21, connected to a source of gas (not shown), flow of gas from the inlet line 21 into the cylinder being controlled by an inlet valve 22. The cylinder is also provided with an outlet line 24, egress of gas from the cylinder into the outlet line 24 being controlled by an outlet valve 26. As is conventional in the art, operation of the dish type valves 22 and 26 is controlled by pressure differentials so that gas is drawn from the inlet line 21 through the inlet valve 22 into the cylinder, there compressed by the piston 18 and the compressed gas allowed to flow out of the cylinder via the valve 26 into the outlet line 24 and thence to an appropriate outlet for compressed gas, e.g., a high pressure gas pipe line.

The apparatus 10 of the invention used in conjunction with the compressor set 12 comprises a first pressure sensor means or suction pressure sensor 30 fixed in the inlet line 21 so as to measure the suction pressure of gas entering the compressor. Appropriate pressure sensors for this purpose are well known to those skilled in the art and are readily available commercially. For example, the suction pressure sensor 30 may be a Model SA manufactured by Data Instruments. Such a sensor 30 generates a first, analog signal representative of the suction pressure of the gas entering the compressor.

The apparatus 10 of the invention further comprises a second pressure sensor means or discharge pressure sensor 32 fixed in the outlet line 24 so as to measure the pressure in this line, which is the discharge pressure of gas leaving the compressor. The pressure sensor 32 generates a second, analog signal representative of this discharge pressure.

The analog signals from the pressure sensors 30 and 32 are sent via lines 34 and 36 respectively to an analog to digital converter 38. The converter 38 converts the analog forms of the first and second signals generated by the pressure sensors 30 and 32 respectively to corresponding digital signals, which are then passed via a line 40 to a microcomputer 42. Although only two signals from the two pressure sensors thus have to be converted to digital form, we have found it convenient to use a four-channel analog to digital converter as the converter 38, since such a four-channel converter allows for further expansion of the system to provide an additional pair of pressure sensors, either to allow a single converter to operate with two separate compressor sets, or to allow for the use of additional suction and discharge pressure sensors, thereby allowing measurement of additional compressor stages. Appropriate four-channel analog to digital converters are readily available commercially, for example, the converter 38 may be a ADC0844 converter manufactured by National Semiconductor Corporation.

The apparatus 10 further comprises an operating speed measuring means in the form of a magnetic pickup 44 disposed adjacent the crankshaft 14 in a manner which will be familiar to those skilled in the art, the magnetic pickup 44 is arranged, in conjunction with appropriate attachments to the crankshaft 14, to generate at least one pulse for each revolution of the crankshaft 14. The pulses produced by the magnetic pickup 44 are transmitted via a line 46 to a revolutions counter 48 which counts the pulses produced by the magnetic pickup 44 and maintains, in its electronic circuitry, a register containing the total number of revolutions undergone by the crankshaft 14. The revolutions counter 48 is connected via a line 50 to the microcomputer 42.

The microcomputer 42 acts as the central processing unit carrying out the logic functions of the apparatus 10. The microcomputer 42 comprises a single board microcomputer such as the commercially available RCA type S600. This computer contains a microprocessor, digital input and output subsystems, a first read-only memory in which is stored an interpreter program for converting a program written in BASIC language to the machine code used by the microprocessor, a random access memory and a second, programmable read-only memory which contains certain constants of the compressor (these constants described in more detail below) and a working program, written in BASIC for calculating the value of a fourth signal representative of the work performed by the compressor during a predetermined time interval from the two digital pressure signals provided by the computer 38 and the signal representative of crankshaft revolutions provided by the counter 48.

The organization of the software used in microcomputer 42 is somewhat unusual. Inconventionally, when a single program is to be used in multiple copies in dedicated microcomputers for applications such as "intelligent" measuring instruments, a programmer writes the original operating program in a high-level language such as BASIC. This high-level language version of the operating program is then converted into an appropriate object code (machine language) version by means of an interpreter program; this conversion of the working program into object code is normally performed by a main-frame or other computer separate from dedicated microcomputer in which the program will eventually be run. Once the object code version of the operating program has been prepared, it is then copied, in multiple copies, into a series of dedicated microcomputers.

In contrast, in the preferred embodiment of the apparatus of the present invention shown in the accompanying drawings, a BASIC-language version of the operating program, and a copy of the interpreter program, are stored in the microcomputer 42. During each cycle of operation of the microcomputer (described in more detail below with reference to FIG. 2), the BASIC-language version of the program is converted to an object code version thereof, prior to employment of the object code version in the process of the present invention. Although this storage of the high-level language version of the program and its repeated conversion into object code within the microprocessor theoretically represents a considerable waste of computing power, this theoretical waste is of no practical importance since a reasonably powerful microcomputer, such as the preferred RCA Type S600 microcomputer, can run the relatively simple operating program required by the process of the present invention in several seconds, whereas in practice, it will not normally be necessary to run the operating program more than once every two minutes. Consequently, in practice there is ample time left to run the conversion of the BASIC-language version of the program into object code in the intervals during which the microcomputer 42 would otherwise be idle.

This storage of the BASIC-language version of the operating program and its repeated conversion to an object code conversion is performed in order that the apparatus of the invention can be rapidly and easily converted for use with differing compressors. A programmer with little training can easily change the compressor constants in a BASIC-language version of the program. However, changing compressor constants in an object code version of the operating program is a much more complicated procedure which cannot be achieved using relatively unskilled programmers. Consequently, we prefer to place a BASIC-language version of the operating program in the programmable read-only memory of the microcomputer 42 in order that relatively unskilled personnel can quickly and easily adapt the program for use with compressors having different compressor constance.

As shown in FIG. 1, power for the operation of the microcomputer 42 and other components for the apparatus of the invention is provided with a solar cell array 52, the output from which is first via a voltage regulator 54 to a 12V rechargeable battery 56. Power is supplied from the rechargeable battery 56 via a voltage converter 58 to the microcomputer 42. Sources of power other than the solar cell array 52 could be used but solar energy is preferred. Wind power could be used to generate power, either alone or in combination with the solar cell. Other power sources as are available could be combined as needed.

The use of the solar cell array or photovoltaic power source 52 enables the apparatus of the present invention shown in FIG. 1 to operate completely independently of any external power sources. This is a marked advantage of the apparatus, since compressor sets are frequently used at remote locations where no source of electrical power is available. Consequently, in many cases the amount of wiring which would be required to connect an apparatus to a source of electrical power would render the use of the apparatus at the remote side impracticable. To make the apparatus economically practical it is imperative that a solar-powered apparatus of the present invention have a low power consumption. To keep the power consumption of the apparatus as low as possible, the microcomputer 42 chosen uses complementary metal oxide semiconductor logic, and all the other electronic logic components of the apparatus also use CMOS. Power consumption is further reduced by placing the operation of the pressure sensors 30 and 32 under the control of the microcomputer 42 (by means of electrical connection not shown) so that power is only supplied to the pressure sensors for part of each operating cycle of the apparatus. Naturally, when the pressure sensors are only powered for part of each operating cycle, appropriate controls must be included in the software to ensure that the conversion of the signals of the pressure sensors by the converter 38 is achieved while the pressure sensors 30 and 32 are properly powered and are thus giving accurate readings.

The apparatus of the present invention shown in FIG. 1 further comprises a function switch 60, which is manually operable and by means of which an operator can cause the microcomputer 42 to calculate and display a plurality of parameters of the compressor. Finally, the apparatus comprises a six-digit decimal liquid crystal display 62 used for displaying the parameters selected by the operator.

Figure 2:
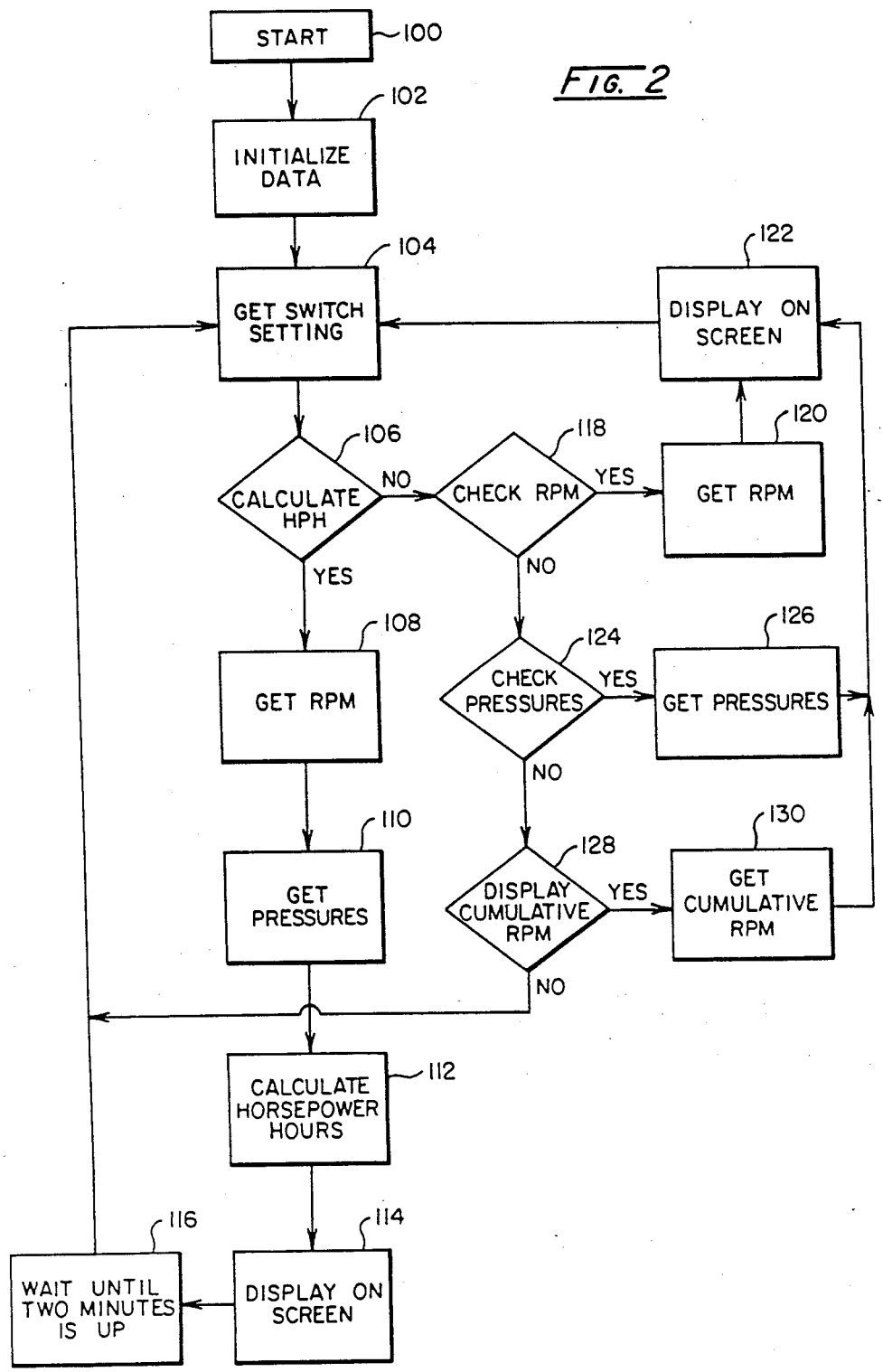
FIG. 2 is a flow diagram of the software used in the apparatus of the invention shown in FIG. 1.

The operating program used by the microcomputer 42 is shown schematically in FIG. 2. As shown in that figure, the program proceeds from a start BLOCK 100 to an initialization BLOCK 102 where the various data registers involved in the calculations are initialized in a manner which will be familiar to those skilled in the art. Next, at BLOCK 104, the microcomputer 42 reads the setting of the function switch in order to determine which parameters are required to be displayed. Having read the switch setting at BLOCK 104, the program then determines, at BLOCK 106, whether display of the total horsepower-hours of work performed by the compressor is to be displayed. If so, the program proceeds to read the number of revolutions effected by the compressor from the counter 48, at BLOCK 108, to read the suction and discharge pressures from the converter 38 at BLOCK 110, and then, at BLOCK 112 calculate the total horsepower hours, and outputs this value to the display 62 at BLOCK 114. Finally, the program waits at BLOCK 116 until two minutes have elapsed since the execution of BLOCK 104, and then recycles back to BLOCK 104.

If at BLOCK 106 the program determines that horsepower-hours is not the desired parameter, it proceeds to BLOCK 118 and checks whether compressor speed is the desired parameter. If so, compressor speed is read from the counter 48 at BLOCK 120 and then, at BLOCK 122, displayed on the display 62. From BLOCK 122, the program recycles back to BLOCK 104. Note that, although BLOCK 122 corresponds in function to BLOCK 114, there is no delay BLOCK between BLOCK 122 and 104 corresponding to BLOCK 116. This omission is deliberate; normally the setting of the switch 60 is for horsepower-hours when the apparatus of the present invention is not being attended, and under these circumstances, the horsepower hours are only calculated every two minutes. (The BLOCK 112 includes both the calculation of horsepower hours elapsed since the last cycle and the addition of that value to the previous horsepower-hour total, so that it is the cumulative horsepower hour total which is displayed at 114.) In contrast, the remaining options for the switch 60 are intended to enable an operator inspecting the apparatus to perform a rapid reading of each of the parameters other than horsepower-hours, so that there is no need to build a delay between BLOCKS 122 and 104 corresponding to the delay 116 between BLOCK 114 and BLOCK 104.

If at BLOCK 118 the program determines that compressor revolutions is not the desired parameter, it proceeds, at BLOCK 124, to determine whether a reading of the suction and discharge pressures is required. If so, the suction and discharge pressures are read from the converter 38 and BLOCK 126, whence the program proceeds via the BLOCK 122 to display the pressures of the display 62, and then recycles back to BLOCK 104.

If at BLOCK 124 it is determined that a pressure check is not required, the program proceeds, at BLOCK 128, to determine whether cumulative compressor revolutions is the parameter desired. If not, there has been an error in reading the switch setting, and consequently the program immediately recycles back to BLOCK 104. If, however, at BLOCK 128 it is determined that cumulative compressor revolutions is the desired parameter, the cumulative compressor revolutions are read, at BLOCK 130, from a cumulative compressor revolutions register maintained within the microcomputer 42, and then the program proceeds via BLOCK 122, where the cumulative compressor revolutions are displayed on the display 62, and then recycles back to BLOCK 104.

The actual calculations required at BLOCK 112 in the above program to calculate horsepower-hours are the same as those already used by those skilled in the art of compressor technology to calculate the instantaneous power output of a compressor. It is well known to those skilled in the art that the brake horsepower output of a compressor compressing natural gas can be calculated by the equation:

$$BHP = \left( .0109 \cdot P_D P_S (Z_S + Z_D) \left[ \frac{.97 C1 \left( \frac{Z_S}{Z_D} \right)}{Z_S E_C} (R_C^{.7937} - 1) \right] \right)(R_C^{.2063} - 1)$$

WHERE:
- $P_S$ = suction pressure
- $P_D$ = discharge pressure
- $Z_S$ = suction supercompressibility = $(1 - 0.00015 P_S)$
- $Z_D$ = discharge supercompressibility = $(1 - 0.00015 P_D)$
- $C1$ = piston clearance (decimal)
- $R_C = P_D/P_S$ = compression ratio
- $E_C$ = compressor efficiency (decimal)
- $P_D$ = piston displacement = (cylinder area)×(stroke)×(RPM)÷1728.

At BLOCK 112 in the above program, the readings of suction and discharge pressures, and the compressor revolutions performed since the previous calculation, are used to calculate the horsepower-hours effected by the pressure during the previous two-minute interval. This value is then added to a total horsepower-hour register within microcomputer 42. For accuracy, a quartz crystal clock is used for timing control.

The apparatus shown in the accompanying drawings can be made compact and easily portable. In addition to the single-board RCA Type S600 microcomputer, a second printed circuit card contains the four-channel A/D converter 38, the revolution counter 48, the voltage regulator 54 and the voltage converter 58. A third printed circuit board mounted behind the display 62 contains the display drivers and signal condition circuitry for the function switch 60. The only external controls required are the function switch 60 and a power switch that also serves to reset the system. All components of the apparatus except for the pressure sensors, solar cell array and the magnetic pickup can be housed in a single housing approximately 30×25×20 cm. Because the only connections required to the compressor are the two pressure sensors and the magnetic pickup to sense crankshaft rotation, the device is easily installed on all reciprocatingtype compressors. The low power consumption of the apparatus means that it can be built to be intrinsically safe. Although primarily designed for use on remotely located compressor sets such as those in natural gas production and storage service, it can be installed on compressors of all types, including, for example, air and refrigeration compressors.

Although we prefer to use a two minute cycle time as one predetermined time interval for calculation of horsepower-hours developed by the compressor this cycle time can be varied quite widely, and may need to be adjusted depending upon how quickly the suction and discharge pressures of the compressor vary with time; obviously, if the suction and discharge pressures fluctuate to a significant interval within a given cycle, an instantaneous reading of the suction and discharge pressures, together with total compressor revolutions over the entire cycle, will not give an accurate measurement of the total horsepower-hours developed. Although we have found two minutes a convenient cycle time, the cycle time may vary, for example over the range of about thirty seconds to about ten minutes.

The power consumption of the device will vary with the exact electrical components included and with the length of time for which the pressure sensors are powered up during each cycle. To avoid an excessively large solar cell array, it is desirable to keep the power consumption of the apparatus, averaged over the complete cycle below about one Watt. It has been found that, constructing the apparatus from commercially available components and powering up the pressure sensors for only ten seconds out of each two-minute cycle enables the power consumption, averaged over the cycle, to be held down to about 250mW; the ten second powering interval for the pressure sensors is more than sufficient to deliver accurate pressure readings therefrom.

Although the apparatus described above is intended to allow read-out of the horsepower-hours by an operator visiting the site at which the apparatus is installed, the apparatus may, if desired, be provided with a transmitter, for example a radio or telephone transmitter, to enable its readings to be sent to a central recording location either at fixed intervals or when an appropriate interrogation signal is received from the central location. Where such facilities for transmission of results to a remote location are provided, the apparatus may also be modified to incorporate an alarm circuit which will transmit an alarm signal if the horsepower-hours developed by the compressor suddenly decline, thereby indicating a possible fault in compressor operation. The apparatus may be modified for use in multi-stage compressors by providing separate pressure sensors for reading the suction and discharge pressures of each stage; indeed, one of the reasons for providing a four-channel analog to digital converter 38 in the specific apparatus disclosed above is to make the apparatus readily usable with two-stage compressors.

In order to calculate the throughput, that is the quantity of gas per unit of time pumped by the compressor, the compressor displacement and piston clearance are also stored in the programmable read only memory as some of the constants of the compressor as described above. These data constants for the particular compressor are then read by the microprocessor along with the suction pressure and discharge pressure from the sensors 30 and 32 and used to calculate the throughput in thousands of standard cubic feet per minute in accordance with the equation:

$$\text{CAPACITY} = \frac{D\, P_S\, E_V}{14.73\, Z_S\, 10^3}$$

WHERE
- D = Displacement rate in cubic feet per minute
- $P_S$ = Suction pressure, PSIA
- $E_V$ = Volumetric efficiency = $0.96 - 0.01 R - C(R^{0.79365} - 1)$
- $Z_S$ = Suction supercompressibility = $(1 - 0.00015 P_S)$
- R = Compression ratio = $P_D/P_S$
- $P_D$ = Discharge pressure
- C = clearance.

A temperature sensing means is also mounted to the compressor for detecting the gas in the flow discharge at the compressor. It generates a signal which is also coupled to the A/D converter 38 in the same manner as the pressure sensors 30 and 32. The temperature sensor detects the temperature of the gas and generates a signal representing that temperature which is converted by the A/D converter 38 to digital form and stored in the random access memory of the microcomputer 42.

The temperature signal is then used to provide a calculation of the throughput to within an accuracy of approximately plus or minus 3% in accordance with the following equation:

$$\text{CAPACITY} = \frac{DP_S E_V 520}{14.73 Z_S 10^3 T_S}$$

WHERE:
$T_S$ = Gas temperature at compressor Input.
Other letters are defined in the immediately prior equation, The microcomputer 42 is further provided with means to calculate the time average of the suction pressure and the time average of the discharge pressure. Since, as described above, the pressure sensors 30 and 32 provide signals which are stored in the microcomputer and are representative of the suction and discharge pressure, the data are available for making this calculation. As described above, the pressure is sensed once every two minutes and therefore the time base for performing this average calculation is readily available. Thus, for example, each pressure measured every two minutes is summed with the previous accumulated total of pressure measurements and divided by the number of such measurements to calculate the average pressure. For a more specific example, one hour after initialization, there will be thirty summed pressure measurements accumulated in memory and this sum is divided by thirty to determine the average pressure for both the suction pressure and the discharge pressure.

Similarly, the microcomputer 42 is arranged to calculate and display the total compressor running time. This is accomplished simply by accumulating clock pulses and displaying the product of the number of pulses multiplied by the pulse period.

Figure 3:
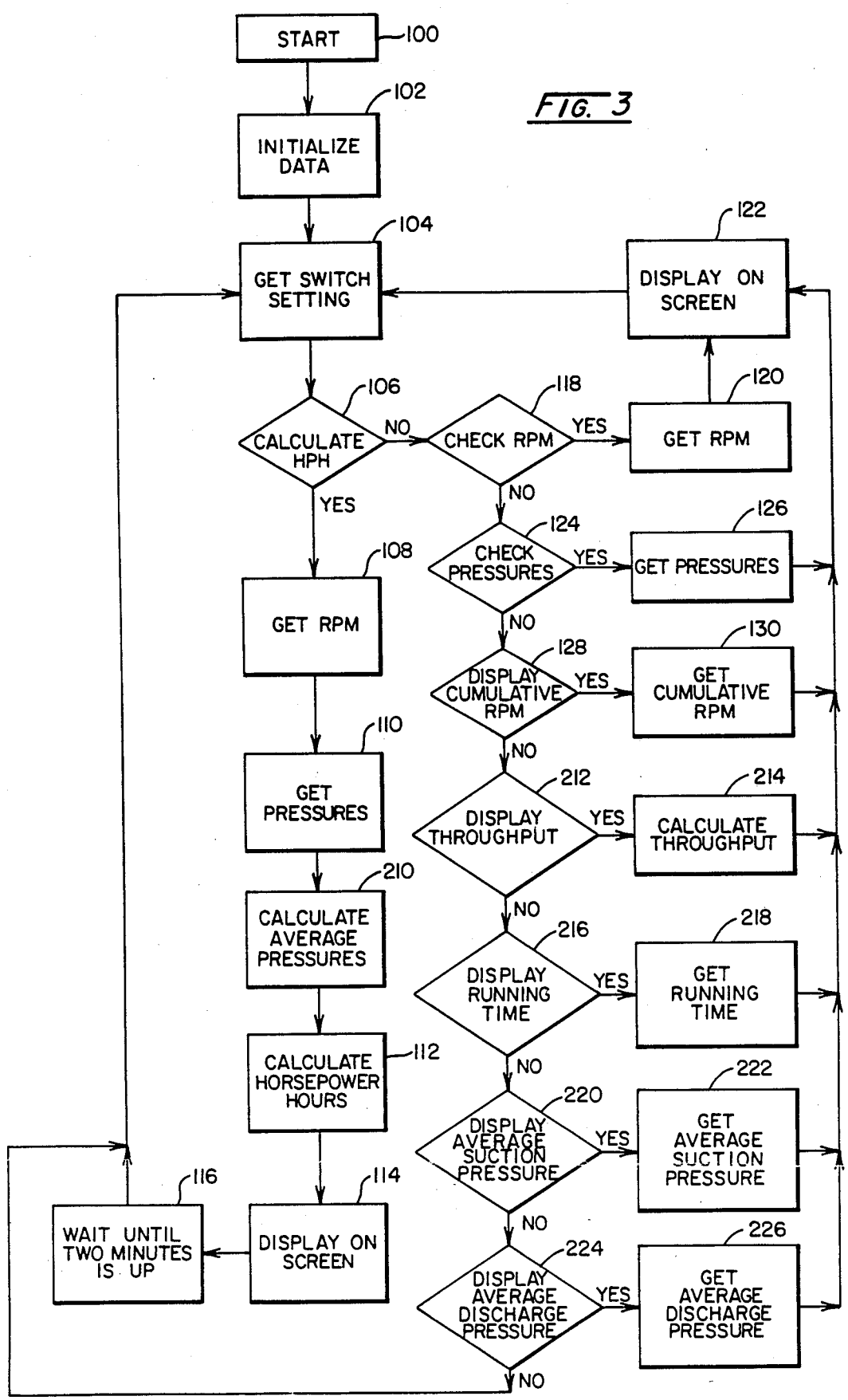
FIG. 3 is a flow diagram of the software illustrating the improvement made in the method illustrated in FIG. 2.

FIG. 3 is a flow charge which represents the methods illustrated in FIG. 2 but into which have been interposed the steps improving the invention of the above cited parent application. The identical reference numerals are utilized in FIG. 3 as were used in FIG. 2 to identify the identical steps.

Referring now to FIG. 3, the box 210 is interposed in the main loop in which the brake horse power hours is calculated. In the box 210 the average suction and discharge pressures are calculated for the current two-minute interval and summed with the previously accumulated average pressures. In addition a counter is incremented by one count to represent an additional two-minute cycle and therefore the addition of an additional pressure to each of the accumulated pressures. These are used for calculating the average pressure which is each time calculated and stored in random access memory along with the counter and the accumulated pressures.

If at BLOCK 128 the program determines that the display of cumulative RPM is not selected, then the program moves to BLOCK 212 to determine whether the display of the throughput is selected. If the display of the throughput is selected, the program proceeds to BLOCK 214 to calculate the throughput in accordance with the above formula and then to display it in accordance with BLOCK 122.

If the program determines that the display throughput is not selected at BLOCK 212, then the program proceeds to BLOCK 216 to determine whether the accumulated total compressor running time is selected. If it is, the program proceeds to BLOCK 218 to retrieve the accumulated running time from memory and then proceeds to BLOCK 122 to display that time.

If the program determines at BLOCK 216 that the display running time is not selected, then the program proceeds to BLOCK 220 to determine whether the display of the average suction pressure is selected. If the display of average suction pressure is selected, then the program proceeds to BLOCK 222 to retrieve the average suction pressure which was calculated at BLOCK 210 and stored in microcomputer memory. The average suction pressure is then displayed at the step in BLOCK 122.

If the program determines at BLOCK 220 that the average suction pressure is not selected, the program then proceeds to BLOCK 224 to determine whether the average discharge pressure is selected. If the average discharge pressure is selected, the program proceeds to BLOCK 226 to retrieve the average discharge pressure which was calculated at BLOCK 210 and stored in the computer memory. The average discharge pressure is then displayed as a result of the action at BLOCK 122. If the program determines that the average discharge pressure is not selected at BLOCK 224, the program then proceeds to recycle to BLOCK 104.

In view of the various possible changes and modifications in the preferred embodiment of the invention described above, the whole of the foregoing description is to be construed in an illustrative and not in a limitative sense, the scope of the invention being defined solely by the appended claims.

We claim:
1. Apparatus for measuring the throughput of a gas compressor, said apparatus comprising:
   (a) an engine operatively connected to said compressor and powered by the same gas being compressed by the compressor;
   (b) a first pressure sensor means for measuring the suction pressure of gas entering said compressor and generating a first signal representative of said suction pressure;
   (c) a second pressure sensor means for measuring the discharge pressure of gas leaving said compressor and generating a second signal representative of said discharge pressure;
   (d) a data storage means for storing signals representative of the piston displacement and piston clearance; and
   (e) a calculating means arranged to receive said first, second and stored signals and to calculate therefrom a fourth signal representative of the throughput by said compressor.

2. An apparatus in accordance with claim 1 further comprising a temperature sensor means for detecting the temperature of said gas and generating a signal representative of said temperature and wherein said calculating means additionally is connected to receive said temperature signal for calculating and generating said throughput signal.

3. An apparatus in accordance with claim 1 wherein said calculating means is further arranged to calculate and generate a signal representing said suction pressure averaged over time and said discharge pressure averaged over time.

4. An apparatus in accordance with claim 1 wherein there is further provided means for detecting and storing the accumulated compressor operating time and means connected thereto for displaying said time.

5. An apparatus in accordance with claim 4 wherein said calculating means is further arranged to calculate and generate a signal representing said suction pressure averaged over time and said discharge pressure averaged over time.

6. An apparatus in accordance with claim 5 further comprising a temperature sensor means for detecting the temperature of said gas and generating a signal representative of said temperature and wherein said calculating means additionally is connected to receive said temperature signal for calculating and generating said throughput signal.

7. An apparatus in accordance with claims 1 or 2 or 3 or 4 or 5 or 6 wherein said engine is connected to said compressor by a periodically cycling component and said apparatus further comprises means for generating a signal representative of the cycling speed of the periodically cycling component of the compressor during a predetermined time interval.

8. An apparatus in accordance with claim 7 further comprising a photovoltaic power source capable of generating electrical energy upon exposure to light; means for connecting the power source to a power supply means for supplying said electrical energy to said first and second pressure sensor means and to said calculating means; and means for controlling the supply of power to the first and second pressure sensor means, said power control means being arranged to supply power to said first and second pressure sensor means for only a powered portion of each predetermined time interval and to leave said first and second pressure sensor means unpowered for the remainder of each predetermined time interval, said calculating means being arranged to read the values of said first and second signals only during the powered portion of each predetermined time interval.

* * * * *